(12) United States Patent
Kim et al.

(10) Patent No.: US 8,493,921 B2
(45) Date of Patent: Jul. 23, 2013

(54) METHOD AND APPARATUS FOR RESOURCE ALLOCATION IN WIRELESS COMMUNICATION SYSTEM

(75) Inventors: Se-Ho Kim, Seoul (KR); Hee-Won Kang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 515 days.

(21) Appl. No.: 12/796,054

(22) Filed: Jun. 8, 2010

(65) Prior Publication Data

US 2010/0316008 A1    Dec. 16, 2010

(30) Foreign Application Priority Data

Jun. 12, 2009 (KR) .................. 10-2009-0052526
Aug. 25, 2009 (KR) .................. 10-2009-0078975
Aug. 31, 2009 (KR) .................. 10-2009-0081605
Nov. 12, 2009 (KR) .................. 10-2009-0109281

(51) Int. Cl.
*H04W 4/00* (2009.01)

(52) U.S. Cl.
USPC ....................................... 370/329

(58) Field of Classification Search
None
See application file for complete search history.

(56) References Cited

U.S. PATENT DOCUMENTS 8,004,977 B2 * 8/2011 Vitebsky et al. ............. 370/230
2009/0097426 A1 * 4/2009 Yin ............................. 370/329

* cited by examiner

*Primary Examiner* — Andrew Lai
*Assistant Examiner* — Leon Andrews
(74) *Attorney, Agent, or Firm* — Jefferson IP Law, LLP

(57) ABSTRACT

A method and an apparatus are disclosed whereby a base station generates a resource allocation Information Element (IE) including an allocation period for persistent allocation and resource allocation information indicating a persistent resource, loads the IE on a map message, and then transmits the map message to a mobile station. The number of Automatic Repeat reQuest Channel Identifiers (ACIDs indicating the number of HARQ channels used for an HARQ operation is calculated based on the maximum retransmission delay for the HARQ operation and the allocation period acquired from the resource allocation IE. Therefore, the present invention minimizes the map overhead for resource allocation according to the persistent allocation scheme.

22 Claims, 7 Drawing Sheets

METHOD AND APPARATUS FOR RESOURCE ALLOCATION IN WIRELESS COMMUNICATION SYSTEM

PRIORITY

This application claims the benefit under 35 U.S.C. §119(a) of Korean patent applications filed in the Korean Industrial Property Office on Jun. 12, Aug. 25, Aug. 31, and Nov. 12, 2009, and respectively assigned Serial Nos. 10-2009-0052526, 10-2009-0078975, 10-2009-0081605, and 10-2009-0109281, the entire disclosures of all of which are hereby incorporated by reference.

BACKGROUND OF THE INVENTION

1. Field of the Invention

The present invention relates to a wireless communication system. More particularly, the present invention relates to a method and an apparatus for allocating persistent resources.

2. Description of the Related Art

In the 4th Generation (4G) communication system, which is a next generation communication system, active research is in progress in order to provide users with services having various Qualities of Service (QoSs) using a transmission speed of about 100 Mbps. Representative 4 G communication systems include systems based on the Institute of Electrical and Electronics Engineers (IEEE) 802.16 standards. The IEEE 802.16 systems employ Orthogonal Frequency Division Multiplexing (OFDM)/Orthogonal Frequency Division Multiple Access (OFDMA) schemes in order to support a broadband transmission network on a physical channel.

In a broadband wireless communication system, such as an IEEE 802.16 system, a base station allocates resources to each mobile station for transmission and reception of packets containing data. The base station transmits a message (for example, a MAP message) including resource allocation Information Elements (IEs) to each mobile station through a downlink channel. The resource allocation IEs indicate results of the resource allocation, such as the location and size of the resources to be allocated, a modulation scheme, and a coding rate. The message indicating the result of resource allocation for an uplink communication and the message indicating the result of resource allocation for a downlink communication are generally configured separately from each other. An information unit necessary for one resource allocation is referred to as a resource allocation Information Element (IE).

The resource allocation is performed for resources within a predetermined range. A related resource allocation IE is transmitted in each predetermined interval, because a resource for general data packets is allocated in the every predetermined interval. However, in the case of the Voice over Internet Protocol (VoIP) service in which packets are periodically transmitted, it may cause unnecessary waste of resources to transmit a related resource allocation IE whenever each packet is transmitted. Therefore, a persistent allocation technique, which can reduce the overhead due to the transmission of a resource allocation IE by performing persistent resource allocation, is applied to services having a periodic traffic pattern and a persistent payload size, such as a VoIP service.

According to the persistent allocation technique, in the case of a downlink communication, packets are transmitted together with a resource allocation IE indicating the persistently allocated resource (a persistent resource) are transmitted only at the time of initial resource allocation. After the initial resource allocation, packets are transmitted without a resource allocation IE. The mobile station keeps on using the persistent resource until de-allocation information or allocation change information is received even if another resource allocation IE is not received. According to the persistent allocation technique, a new resource allocation IE should be transmitted for persistent allocation of a new resource when there is a change in the already allocated resources. A de-allocation of the persistent resource occurs as soon as a de-allocation information of the VoIP service is received.

In the IEEE 802.16m system, the resource allocation is classified into a non-persistent resource allocation and a persistent resource allocation. In the IEEE 802.16m system, since the resource allocation IE is transmitted through a User Specific Control Channel (USCCH), each mobile station can receive only the resource allocation IE allocated to itself. In the USCCH, it is preferred that each resource allocation IE has a persistent length, in order to enable each mobile station to easily identify the resource allocation IE allocated to itself. In designing the resource allocation IE in a wireless communication system using the persistent allocation as described above, a technology for minimizing the fields included in the resource allocation IE is needed in order to reduce the size of the resource allocation IE.

SUMMARY OF THE INVENTION

An aspect of the present invention is to address at least the above-mentioned problems and/or disadvantages and to provide a least the advantages described below. Accordingly, an aspect of the present invention is to provide a method and an apparatus capable of reducing an overhead for persistent allocation.

Another aspect of the present invention is to provide a method and an apparatus for efficient reduction of an overhead of a resource allocation IE in a wireless communication system.

An additional aspect of the present invention is to provide a method and an apparatus for minimizing the fields included in a resource allocation IE in a wireless communication system.

In accordance with an aspect of the present invention, a method of resource allocation according to a persistent allocation in a wireless communication system is provided. The method includes generating a persistent allocation Information Element (IE) including an allocation period for persistent allocation and resource allocation information indicating a persistent resource, and transmitting the persistent allocation IE to a mobile station, wherein the allocation period and a maximum retransmission delay are used for calculating a number of Automatic Repeat reQuest Channel Identifiers (ACIDs) indicating the number of Hybrid Automatic Repeat Request (HARQ) channels used for a HARQ operation through the persistent resource.

In accordance with another aspect of the present invention, a method of receiving a resource allocation according to a persistent allocation in a wireless communication system is provided. The method includes receiving a persistent allocation IE, which includes an allocation period for persistent allocation and resource allocation information indicating a persistent resource, from a base station, and calculating the number of ACIDs based on the allocation period and the maximum retransmission delay for the HARQ operation, the number of ACIDs indicating a number of HARQ channels used for a HARQ operation through the persistent resource.

In accordance with another aspect of the present invention, a base station apparatus performing resource allocation according to a persistent allocation in a wireless communication system is provided. The base station apparatus includes a generator for generating a persistent allocation IE including an allocation period for persistent allocation and resource allocation information indicating a persistent resource, and a transmitter for transmitting the persistent allocation IE to a mobile station, wherein the allocation period and a maximum retransmission delay are used in calculating a number of ACIDs indicating a number of HARQ channels used for a HARQ operation through the persistent resource.

In accordance with another aspect of the present invention, a mobile station apparatus for receiving a resource allocation according to a persistent allocation in a wireless communication system is provided. The mobile station apparatus includes a receiver for receiving a persistent allocation IE, which includes an allocation period for persistent allocation and resource allocation information indicating a persistent resource, from a base station, and a controller for calculating the number of ACIDs based on the allocation period and the maximum retransmission delay for the HARQ operation, the number of ACIDs indicating a number of HARQ channels used for a HARQ operation through the persistent resource.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF THE EXEMPLARY EMBODIMENT

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Now, a resource allocation technique usable in a broadband wireless communication system is discussed. Although the following description about the present invention employs a wireless communication system using the IEEE 802.16m standard as an example, exemplary embodiments of the present invention can also be applied to other wireless communication systems, which have similar technical backgrounds and resource types and also employ a persistent allocation scheme.

Figure 1:
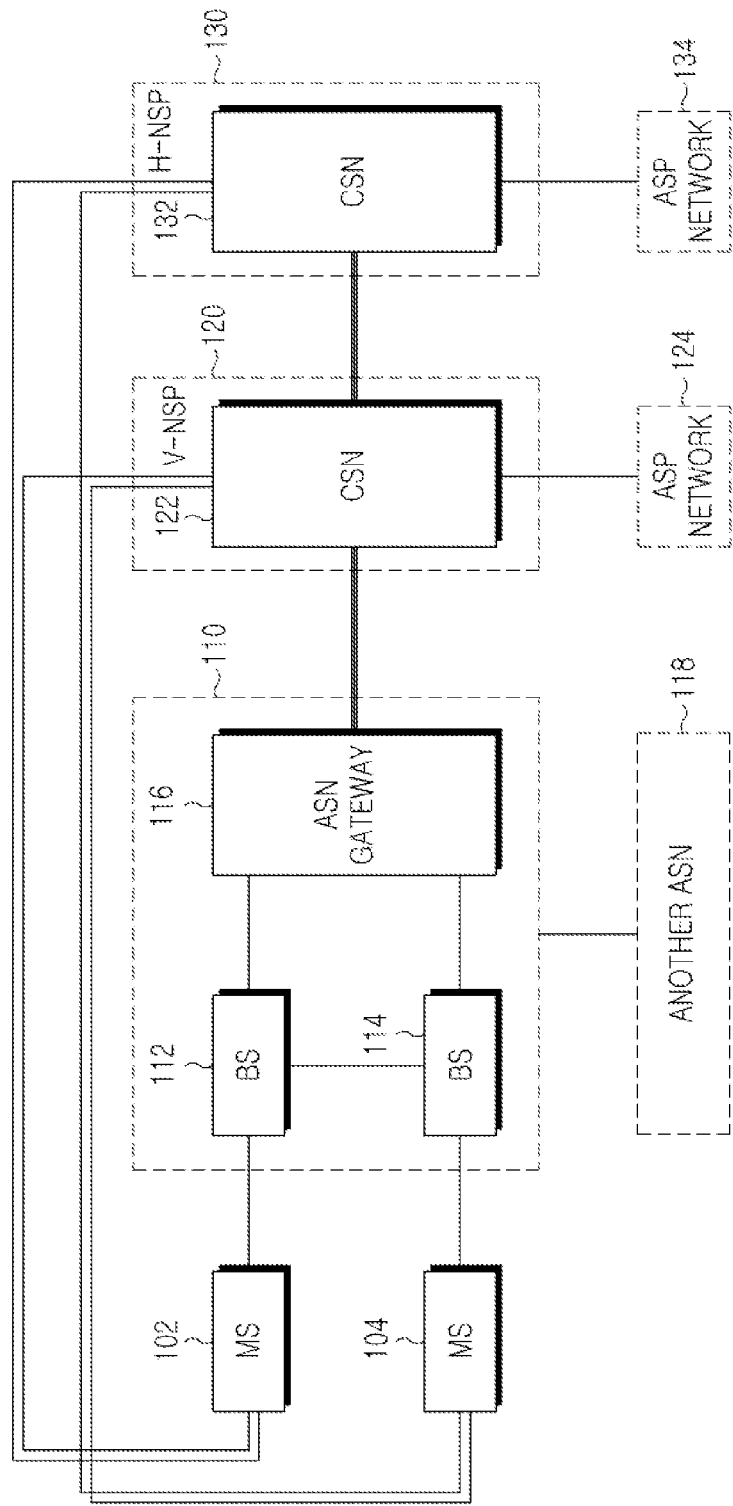
FIG. 1 is a block diagram schematically illustrating a structure of a broadband wireless communication system according to an exemplary embodiment of the present invention.

FIG. 1 is a block diagram schematically illustrating a structure of a broadband wireless communication system according to an exemplary embodiment of the present invention.

Referring to FIG. 1, a wireless communication system includes at least one Mobile Station (MS) 102 and 104, at least one Access Service Network (ASN) 110 and 118, and at least one Connectivity Service Network (CSN) 122 and 132. Each CSN 122 or 132 belongs to a Visited Network Service Provider (V-NSP) 120 or a Home Network Service Provider (H-NSP) 130, to which a corresponding MS 102 or 104 has been registered, and can access an Access Service Provider (ASP) network 124 and 134, such as the Internet. For example, in the case of a model based on an 802.16-anchored network, the MS 102 or 104 supports the 802.16e standard or the 802.16m standard.

The ASN 110 includes functional blocks capable of performing network functions for providing subscribers having the MSs 102 and 104 with a radio access. The ASN 110 establishes layer 1 connection and layer 2 connection with the MSs 102 and 104 and layer 3 connection with the NSPs 120 and 130, thereby supporting the MSs 102 and 104 to access the network and achieving a radio resource management for efficient wireless communication. For mobility management, the ASN 110 provides functions including ASN anchored mobility, CSN anchored mobility, paging, and ASN-CSN tunneling. Accordingly, the ASN 110 includes at least one Base Station (BS) 112 and 114 connected to the MSs 102 and 104, and at least one ASN gateway 116 connected to the NSPs 120 and 130.

The CSN 122 and 132 includes functional blocks capable of network functions for providing the subscribers having the MSs 102 and 104 with Internet Protocol (IP) connectivity services. The CSN 122 and 132 each allocate an endpoint parameter and an IP address for a user session to the MS 102 or 104, supports ASN-CSN tunneling and tunneling between CSNs, and manages mobility between ASNs.

Figure 2:
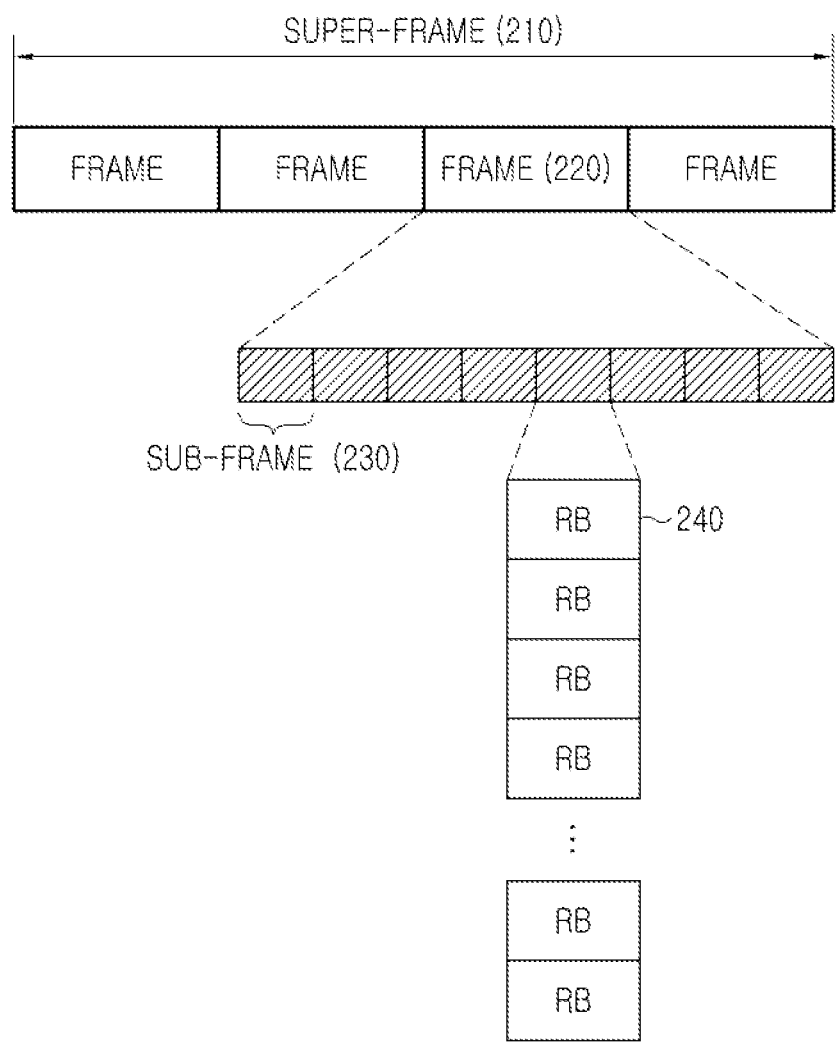
FIG. 2 illustrates a structure of a frame of a broadband wireless communication system according to an exemplary embodiment of the present invention.

FIG. 2 illustrates a structure of a frame of a broadband wireless communication system according to an exemplary embodiment of the present invention. The wireless communication between a BS and an MS is based on the frame.

Referring to FIG. 2, each super-frame 210 includes multiple frames 220, each frame 220 includes multiple sub-frames 230, and each sub-frame 230 includes multiple OFDMA symbols. Resource allocation is performed for each sub-frame, and the resource allocation within each sub-frame is performed in a unit of Resource Block (RB) 240. In order to allocate a predetermined number of RBs to be used for communication relating to each connection by the MS, the BS transmits a MAP message including resource allocation information indicating resource location and size of the allocated RBs to the MS.

The MAP message for resource allocation is usually transmitted for each sub-frame. The MAP message includes resource allocation IEs each indicating a resource allocation of each link and each connection. Each resource allocation IE is subjected to a Cyclic Redundancy Check (CRC) processing based on a particular sequence allocated to an MS which should have received the resource allocation IE. The MS performs a CRC of each resource allocation IE based on a sequence allocated to the MS, thereby identifying the resource allocation IE for itself. Such a MAP IE coding scheme is referred to as a separate coding.

For data traffic, such as VoIP data traffic, having a traffic characteristic between a BS and an MS that packets containing data bursts are periodically generated, resource allocation is performed according to the persistent allocation scheme. The transmission period of the packets allocated according to the persistent allocation scheme is determined by the Allocation Period (AP), which is expressed as the number of frames. When persistent resources have been allocated, the packets are periodically transmitted according to the AP at a persistent resource location. In comparison with the transmission of previous packets, when the resource allocation has been neither changed nor de-allocated, the packets are continuously transmitted at the persistent resource location even without transmission of a resource allocation IE.

The BS and the MS support a Hybrid Automatic Repeat Request (HARQ) operation for error correction of the received packets through each allocated resource. If a transmitter, which is one of the BS and the MS, transmits a packet, a receiver, which is the other of the BS and the MS, transmits a HARQ feedback in response to the packet. The HARQ feedback indicates whether the packet has an error. When an error is detected from the transmitted packet by the HARQ feedback, the packet is re-transmitted at least one more time in order to correct the error.

Each connection between the BS and the MS may have multiple HARQ channels for independently performing the HARQ operation. In order to improve the processing speed of the packets, the HARQ channels perform the HARQ operations in parallel and are identified by HARQ channel identifiers, each of which is referred to as an ARQ Channel Identifier (ACID). Since the packets of each HARQ channel are transmitted with the same ACID, the receiver can use the ACID to discriminate between the initially transmitted packets and the retransmitted packets in the same HARQ channel.

In the case where the persistent allocation is used for data traffic according to the HARQ scheme, the persistent resource is used only in the initial packet transmission. Resources for retransmission determined according to the asynchronous HARQ or synchronous HARQ scheme may be used for the retransmitted packets. For example, the asynchronous HARQ scheme may be used for the downlink (DL) from the BS to the MS, and the synchronous HARQ scheme may be used for the uplink (UL) from the MS to the BS. In the case of the asynchronous HARQ scheme, since the resources for retransmission are allocated through a separate means, the retransmission time point and resource location may change. In the case of the synchronous HARQ scheme, since the resources for retransmission are transmitted at resource locations determined according to a predetermined rule based on the resource location at the initial transmission, the transmission time points and resource locations are relatively constant.

In order to allocate persistent resources for a data traffic supporting the HARQ operation, the BS may provide the MS with various information through a resource allocation IE. The information may include, for example, an ACID number (N_ACID) field and an ACID field used in the persistent allocation together with resource allocation information indicating the resource location and size of the persistent resources. The ACID field indicates the start value of the ACID used for group resource allocation, and the N_ACID field indicates the number of ACIDs used for group resource allocation. The ACID field and the N_ACID field are used in order to clarify the implicit cycling of the HARQ channel identifiers. Each of the packets generated from the HARQ channel has a HARQ channel identifier (i.e. ACID value), which is set in a cycle according to the number of ACIDs from the ACID start value.

Figure 3:
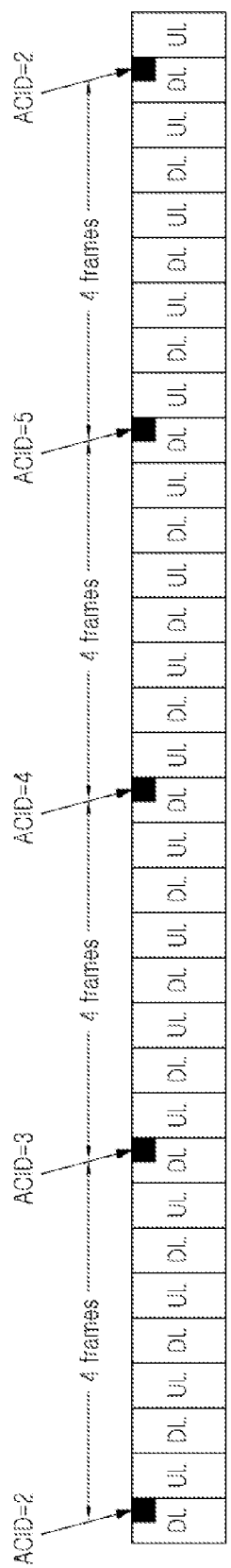
FIG. 3 illustrates an example of allocation of an Automatic repeat request Channel IDentifier (ACID) for an initial transmission packet when a persistent allocation is used for data traffic to which the Hybrid Automatic Repeat request (HARQ) is applied according to an exemplary embodiment of the present invention.

FIG. 3 illustrates an example of allocation of an ACID for an initial transmission packet when a persistent allocation is used for a data traffic to which the HARQ is applied, wherein each frame includes a DL period and a UL period, according to an exemplary embodiment of the present invention.

Referring to FIG. 3, since the allocation period has a length of four frames, a particular persistent resource of every 4th frame is used for transmission of the packet to which the persistent allocation is applied. FIG. 3 shows only the initial transmission of each packet. When the ACID start value is 2 and the number of ACIDs is 4, the ACID value of each initial transmission packet at every transmission through the persistent resource is set to values, such as 2, 3, 4, 5, 2, 3, 4, and 5, in a cycle with a period corresponding to the number of ACIDs.

Table 1 below shows a format of a resource allocation IE used to notify the MS of the number of ACIDs and the allocation period at the time of persistent allocation according to an exemplary embodiment of the present invention. The exemplary resource allocation IE for persistent allocation shown in Table 1 corresponds to a DL persistent allocation MAP IE used in the IEEE 802.16m system.

TABLE 1

| Syntax | Size in bits | Description/Notes |
|---|---|---|
| DL Persistent A-MAP_IE ( ) { | — | — |
| Allocation Period | 2 | Period of persistent allocation<br>If (Allocation Period == 0b00), it indicates the deallocation of a persistently allocated resource.<br>0b00: deallocation<br>0b01: 2 frames<br>0b10: 4 frames<br>0b11: 8 frames |
| If (Allocation Period==0b00){ | | |
|   Resource Allocation | Variable | Variable number of bits - depends on system bandwidth. Information may include:<br>Type of resource unit (DRU/CRU)<br>Location (start/end)<br>Allocation size |
|   HFA | [4] | HARQ Feedback Allocation |
| } else if (Allocation Period != 0b00){ | | |
|   MCS | 4 | Depends on supported modes, 16 modes assumed as baseline |
|   MEF | 2 | MIMO encoder format<br>0b00: SFBC<br>0b01: Vertical encoding<br>0b10: Horizontal encoding<br>0b11: n/a |
|   if (MEF == 0b01){<br>    if(Nt == 2){ | | Parameters for vertical encoding |
|       Mt | 1 | Number of streams in transmission for Nt = 2<br>($M_t <= N_t$)<br>0b0: 1 stream<br>0b1: 2 streams |
|     }else if(Nt == 4){ | | |
|       Mt | 2 | Number of streams in transmission for Nt = 4<br>($M_t <= N_t$)<br>0b00: 1 stream<br>0b01: 2 streams<br>0b10: 3 streams<br>0b11: 4 streams |
|     }else if(Nt == 8){ | | |
|       Mt | 3 | Number of streams in transmission for Nt = 8<br>($M_t <= N_t$)<br>0b000: 1 stream<br>0b001: 2 streams<br>0b010: 3 streams<br>0b011: 4 streams<br>0b100: 5 streams<br>0b101: 6 streams<br>0b110: 7 streams<br>0b111: 8 streams |
|     }<br>  } else if(MEF == 0b10){<br>    if(Nt == 2){ | | Parameters for horizontal encoding |
|       PSI | 1 | Allocated pilot stream index for Nt = 2<br>0b0: #1 stream<br>0b1: #2 stream |
|       Mt | 1 | Number of streams in transmission for Nt = 2<br>($M_t <= N_t$)<br>0b0: 1 stream<br>0b1: 2 streams |
|     } else{ | | |
|       PSI | 2 | Allocated pilot stream index for Nt = 4 or 8<br>0b00: #1 stream<br>0b01: #2 stream<br>0b10: #3 stream<br>0b11: #4 stream |
|       Mt | 2 | Number of streams in transmission for Nt = 4 or 8<br>($M_t <= N_t$)<br>0b00: 1 stream<br>0b01: 2 streams<br>0b10: 3 streams<br>0b11: 4 streams |
|     }<br>  } | | |

TABLE 1-continued

| Syntax | Size in bits | Description/Notes |
| --- | --- | --- |
| Resource Allocation | Variable | Variable number of bits - depends on system bandwidth. Information may include:<br>Type of resource unit (DRU/CRU)<br>Location (start/end)<br>Allocation size |
| Long TTI Indicator | 1 | Indicates number of subframes spanned by the allocated resource.<br>0b0: 1 subframe (default)<br>0b1: 4 DL subframes for FDD or all DL subframes for TDD |
| if ($N_{subframe, A-MAP}$ == 2){ | | |
|   Allocation Relevance | 1 | Subframe index when an A-MAP region occurs every 2 subframes ($N_{subframe}$, A-MAP = 2)<br>0b0: Allocation in the first DL subframe relevant to an A-MAP region<br>0b1: Allocation in the second DL subframe relevant to an A-MAP region |
| } | | |
| HFA | [4] | HARQ Feedback Allocation |
| ACID | 4 | HARQ channel identifier. The ACID field should be set to the initial value of HARQ channel identifier for implicit cycling of HARQ channel identifiers. |
| N_ACID | 2 | Number of ACIDs for implicit cycling of HARQ channel identifier<br>0b00: 2<br>0b01: 3<br>0b10: 4<br>0b11: 5 |
| } | | |
| Reserved | TBD | Reserved bits |
| Padding | Variable | Padding to reach byte boundary |
| } | — | — |

In Table 1, the allocation period field indicates de-allocation of persistently allocated resources ("0b00") or indicates that the period for resource persistent allocation has a length of 2 frames, 4 frames, or 8 frames. When the allocation period field has the value of "0b00", the DL persistent allocation MAP IE includes resource allocation information, which includes the type of Resource Unit (RU), which is a Contiguous Resource Unit (CRU) or a Distributed RU (DRU), the resource locations (start point and end point), and the size of the allocated resources, and an HARQ Feedback Allocation (HFA) field indicating the resources allocated for HARQ feedback.

When the value of the allocation period field is not "0b00", the DL persistent allocation MAP IE includes a Modulation and Coding Scheme (MCS) field, a Multiple Input and Multiple Output (MIMO) Encoder Format (MEF) field, resource allocation information, a long Transmission Time Interval (TTI) indicator, an HFA field, an ACID field, and an N_ACID field. When the DL persistent allocation MAP IE is transmitted every two sub-frames, the DL persistent allocation MAP IE may further include allocation relevance information indicating the sub-frame index of the sub-frame carrying the DL persistent allocation MAP IE.

The MCS field indicates a Modulation and Coding Scheme (MCS) mode used for the packet transmission. The MEF field indicates a MIMO encoding format. When the MEF field has a value of "0b01", which indicates vertical encoding, the MEF field includes Nt and Mt, which indicate the number of transmission antennas and the number of streams to be transmitted, respectively. When the MEF field has a value of "0b10", which indicates horizontal encoding, the MEF field includes an allocated Pilot Stream Index (PSI) field, as well as Nt and Mt. When the MEF field has a value of "0b00", which indicates the Space-Frequency Block Coding (SFBC), or "0b11", which is an unavailable value, the MEF field includes the PSI field and Mt.

As described above, the N_ACID field indicates the number of ACIDs for implicit cycling of the HARQ channel identifier, which has a value between 2 and 5. The number of ACIDs is closely related to the allocation period and the Maximum Retransmission Delay (Max_ReTx_Delay). The packet transmission/retransmission according to the HARQ operation should be performed within the maximum retransmission delay. A packet that is unable to be restored within the maximum retransmission delay is discarded. The maximum retransmission delay may be calculated or determined in advance based on a used HARQ scheme and various system parameters. For example, the retransmission delay boundary value (ReTx_Delay_Bound) may be used in the asynchronous HARQ, while the Maximum number of Retransmissions (N_Max_ReTx) may be used in the synchronous HARQ.

When the ACID value is used in a cycle in the persistent allocation, the ACID value of each packet should be set to a value that does not overlap the ACID value of the HARQ retransmission packet. For example, when retransmission of a packet having an ACID value of 5 is not completed, if 5 is allocated to an ACID value of a new initial transmission packet, the receiver may incorrectly combine the initial transmission packet with the retransmission packet having the same ACID value. Therefore, the number of ACIDs should be determined according to the maximum retransmission delay for the HARQ operation.

Figure 4:
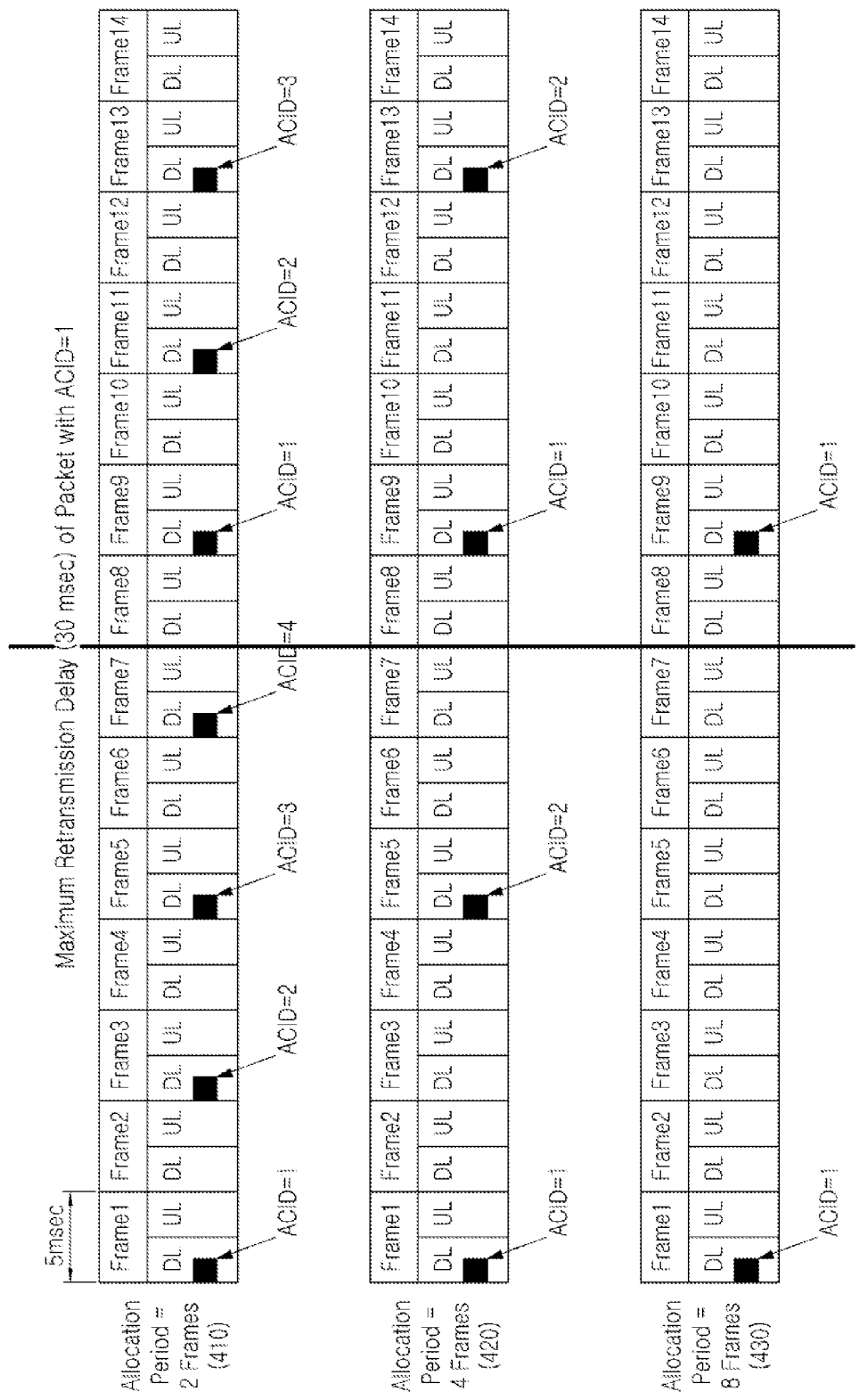
FIG. 4 illustrates an example of the number of ACIDs according to the allocation period and the retransmission delay boundary value when the persistent allocation is used for data traffic to which the HARQ is applied according to an exemplary embodiment of the present invention.

FIG. 4 illustrates an example of the number of ACIDs according to the allocation period and the retransmission delay boundary value when the persistent allocation is used for a data traffic to which the HARQ is applied according to an exemplary embodiment of the present invention, wherein the frame length is 5 ms. The ACID value increases at every 2 frames when the allocation period has a length of 2 frames, increases at every 4 frames when the allocation period has a length of 4 frames, and increases at every 8 frames when the allocation period has a length of 8 frames.

Referring to FIG. 4, when the frame length is 5 ms, the retransmission delay boundary value is 30 ms (6 frames), and the allocation period is 2 frames as in the super-frame 410, if a packet having an ACID value of 1 (ACID=1) is transmitted at frame #1, then the HARQ retransmission of the packet can be performed up to only the seventh frame. If the transmission of the packet is not a success even at frame #8, which exceeds the retransmission delay boundary value, that packet is discarded. Therefore, the ACID value of 1 (ACID=1) can be used again at frame #8. When the allocation period is 2 frames and the retransmission delay boundary value is 30 ms (6 frames), the ACID may have a value in a cycle, such as 1, 2, 3, 4, 1, 2, 3, 4, . . . , so that the number of ACIDs necessary for the persistent allocation is four.

In the same way, when the allocation period is 4 frames and the retransmission delay boundary value is 30 ms (6 frames) as in the super-frame 420, the ACID may have a value in a cycle, such as 1, 2, 1, 2, . . . , so that the number of ACIDs necessary for the persistent allocation is two. Also, when the allocation period is 8 frames and the retransmission delay boundary value is 30 ms (6 frames) as in the super-frame 430, the ACID may have a value in a cycle, such as 1, 1, 1, 1, . . . , so that the number of ACIDs necessary for the persistent allocation is one.

According to the example shown in FIG. 4, the number of ACIDs necessary for the persistent allocation can be determined as shown in Table 2 below according to the allocation period and the retransmission delay boundary value.

TABLE 2

|  |  | Retransmission delay boundary value | | | | | | | | |
|---|---|---|---|---|---|---|---|---|---|---|
|  |  | 5 ms | 10 ms | 15 ms | 20 ms | 25 ms | 30 ms | 35 ms | 40 ms | 45 ms |
| Allocation period | 2 frame | 1 | 2 | 2 | 3 | 3 | 4 | 4 | 5 | 5 |
|  | 4 frame | 1 | 1 | 1 | 2 | 2 | 2 | 2 | 3 | 3 |
|  | 8 frame | 1 | 1 | 1 | 1 | 1 | 1 | 1 | 2 | 2 |
|  | . . . | . . . | . . . | . . . | . . . | . . . | . . . | . . . | . . . | . . . |

As noted from Table 2, when the retransmission delay boundary value is converted to the number of frames, the number of ACIDs necessary for the persistent allocation increases by one whenever the retransmission delay boundary value becomes a multiple of the allocation period. Therefore, the number (N_ACID) of ACIDs necessary for the persistent allocation can be obtained using the allocation period and the retransmission delay boundary value as in Equation (1) defined below.

$$N\_ACID = \text{Floor}\{(Max\_ReTx\_Delay)/(Allocation\_Period)\} + 1 \quad (1)$$

In equation (1), the allocation period and the allowable maximum retransmission delay have values expressed in a unit of frame.

According to an exemplary embodiment of the present invention, a BS transmits only the allocation period without information on the N_ACID to the MS through a resource allocation IE. The N_ACID is calculated based on the allocation period and the maximum retransmission delay (e.g. the retransmission delay boundary value or the maximum number of retransmissions) included in the resource allocation IE.

Table 3A below shows a format of a resource allocation IE used in the case of using an asynchronous HARQ scheme according to an exemplary embodiment of the present invention.

TABLE 3A

| Syntax | Size in bits | Description/Notes |
|---|---|---|
| DL Persistent A-MAP_IE( ) { | — | — |
| Allocation Period | [2] | Indicate Allocation Period (AP) and N_ACID for persistent allocation<br>00: deallocation<br>01: 2 frames<br>10: 4 frames<br>11: 8 frames<br>When Allocation Period > 0<br>N_ACID = Floor{(Max_ReTx_Delay)/(Allocation Period * Frame_Length)} + 1 |

TABLE 3A-continued

| Syntax | Size in bits | Description/Notes |
| --- | --- | --- |
| If (Allocation Period==00b00){ | | |
|   Resource Allocation | Variable | Variable number of bits - depends on system bandwidth. Information may include: Type of resource unit (DRU/CRU) Location (start/end) Allocation size |
|   HFA | [4] | HARQ Feedback Allocation |
| } else if (Allocation Period != 0b00){ | | |
|   MCS | 4 | Depends on supported modes, 16 modes assumed as baseline |
|   MEF | 2 | MIMO encoder format 0b00: SFBC 0b01: Vertical encoding 0b10: Horizontal encoding 0b11: n/a |
|   if (MEF == 0b01){ | | Parameters for vertical encoding |
|     if(Nt == 2){ | | |
|       Mt | 1 | Number of streams in transmission for Nt = 2 (Mt <= Nt) 0b0: 1 stream 0b1: 2 streams |
|     }else if(Nt == 4){ | | |
|       Mt | 2 | Number of streams in transmission for Nt = 4 (Mt <= Nt) 0b00: 1 stream 0b01: 2 streams 0b10: 3 streams 0b11: 4 streams |
|     }else if(Nt == 8){ | | |
|       Mt | 3 | Number of streams in transmission for Nt = 8 (Mt <= Nt) 0b000: 1 stream 0b001: 2 streams 0b010: 3 streams 0b011: 4 streams 0b100: 5 streams 0b101: 6 streams 0b110: 7 streams 0b111: 8 streams |
|     } | | |
|   } else if(MEF == 0b10){ | | Parameters for horizontal encoding |
|     if(Nt == 2){ | | |
|       PSI | 1 | Allocated pilot stream index for Nt = 2 0b0: #1 stream 0b1: #2 stream |
|       Mt | 1 | Number of streams in transmission for Nt = 2 (Mt <= Nt) 0b0: 1 stream 0b1: 2 streams |
|     } else{ | | |
|       PSI | 2 | Allocated pilot stream index for Nt = 4 or 8 0b00: #1 stream 0b01: #2 stream 0b10: #3 stream 0b11: #4 stream |
|       Mt | 2 | Number of streams in transmission for Nt = 4 or 8 (Mt <= Nt) 0b00: 1 stream 0b01: 2 streams 0b10: 3 streams 0b11: 4 streams |
|     } | | |
|   } | | |
|   Resource Allocation | Variable | Variable number of bits - depends on system bandwidth. Information may include: Type of resource unit (DRU/CRU) Location (start/end) Allocation size |

TABLE 3A-continued

| Syntax | Size in bits | Description/Notes |
|---|---|---|
| Long TTI Indicator | 1 | Indicates number of subframes spanned by the allocated resource. <br> 0b0: 1 subframe (default) <br> 0b1: 4 DL subframes for FDD or all DL subframes for TDD |
| if ($N_{subframe, A-MAP}$ == 2){ | | |
|   Allocation Relevance | 1 | Subframe index when an A-MAP region occurs every 2 subframes ($N_{subframe}$, A-MAP = 2) <br> 0b0: Allocation in the first DL subframe relevant to an A-MAP region <br> 0b1: Allocation in the second DL subframe relevant to an A-MAP region |
| } | | |
| HFA | [4] | HARQ Feedback Allocation |
| ACID | 4 | HARQ channel identifier. The ACID field should be set to the initial value of HARQ channel identifier for implicit cycling of HARQ channel identifiers. |
| } | | |
| Reserved | TBD | Reserved bits |
| Padding | Variable | Padding to reach byte boundary |
| } | — | — |

The specific format of Table 3A does not limit the scope of the present invention, and some fields may be omitted, added, or rearranged in Table 3A. Table 3B below shows a format of a resource allocation IE according to another exemplary embodiment of the present invention. In Table 3B, a mathematical expression relating to the calculation of N_ACID is inserted in the information field of the ACID instead of the information field of the allocation period. According to another exemplary embodiment of the present invention, the mathematical expression relating to the calculation of N_ACID can be inserted in another location.

TABLE 3B

| Syntax | Size in bits | Description/Notes |
|---|---|---|
| DL Persistent A-MAP_IE( ) { | — | — |
| Allocation Period | [2] | Indicate Allocation Period (AP) and N_ACID for persistent allocation <br> 00: deallocation <br> 01: Allocation Period = 2 frames <br> 10: Allocation Period = 4 frames <br> 11: Allocation Period = 8 frames |
| If (Allocation Period==0b00){ | | |
| Resource Allocation | Variable | Variable number of bits - depends on system bandwidth. <br> Information may include: <br> Type of resource unit (DRU/CRU) <br> Location (start/end) <br> Allocation size |
|   HFA | [4] | HARQ Feedback Allocation |
| } else if (Allocation Period != 0b00){ | | |
|   MCS | 4 | Depends on supported modes, 16 modes assumed as baseline |
|   MEF | 2 | MIMO encoder format <br> 0b00: SFBC <br> 0b01: Vertical encoding <br> 0b10: Horizontal encoding <br> 0b11: n/a |
|   if (MEF == 0b01){ | | Parameters for vertical encoding |
|     if(Nt == 2){ | | |
|   Mt | 1 | Number of streams in transmission for Nt = 2 <br> (Mt <= Nt) <br> 0b0: 1 stream <br> 0b1: 2 streams |
|   }else | | |

TABLE 3B-continued

| Syntax | Size in bits | Description/Notes |
|---|---|---|
| if(Nt == 4){ | | |
| Mt | 2 | Number of streams in transmission for Nt = 4 <br> (Mt <= Nt) <br> 0b00: 1 stream <br> 0b01: 2 streams <br> 0b10: 3 streams <br> 0b11: 4 streams |
| }else if(Nt == 8){ | | |
| Mt | 3 | Number of streams in transmission for Nt = 8 <br> (Mt <= Nt) <br> 0b000: 1 stream <br> 0b001: 2 streams <br> 0b010: 3 streams <br> 0b011: 4 streams <br> 0b100: 5 streams <br> 0b101: 6 streams <br> 0b110: 7 streams <br> 0b111: 8 streams |
| } } else if(MEF == 0b10){ if(Nt == 2){ | | Parameters for horizontal encoding |
| PSI | 1 | Allocated pilot stream index for Nt = 2 <br> 0b0: #1 stream <br> 0b1: #2 stream |
| Mt | 1 | Number of streams in transmission for Nt = 2 <br> (Mt <= Nt) <br> 0b0: 1 stream <br> 0b1: 2 streams |
| } else{ | | |
| PSI | 2 | Allocated pilot stream index for Nt = 4 or 8 <br> 0b00: #1 stream <br> 0b01: #2 stream <br> 0b10: #3 stream <br> 0b11: #4 stream |
| Mt | 2 | Number of streams in transmission for Nt = 4 or 8 <br> (Mt <= Nt) <br> 0b00: 1 stream <br> 0b01: 2 streams <br> 0b10: 3 streams <br> 0b11: 4 streams |
| } } Resource Allocation | Variable | Variable number of bits - depends on system bandwidth. <br> Information may include: <br> Type of resource unit (DRU/CRU) <br> Location (start/end) <br> Allocation size |
| Long TTI Indicator | 1 | Indicates number of subframes spanned by the allocated resource. <br> 0b0: 1 subframe (default) <br> 0b1: 4 DL subframes for FDD or all DL subframes for TDD |
| if ($N_{subframe, A\text{-}MAP}$ == 2){ Allocation Relevance | 1 | Subframe index when an A-MAP region occurs every 2 subframes ($N_{subframe, A\text{-}MAP}$ = 2) <br> 0b0: Allocation in the first DL subframe relevant to an A-MAP region <br> 0b1: Allocation in the second DL subframe relevant to an A-MAP region |
| } HFA | [4] | HARQ Feedback Allocation |
| ACID | 4 | HARQ channel identifier. The ACID field should be set to the initial value of HARQ channel identifier for implicit cycling of HARQ channel identifiers. <br> N_ACIDs: Number of ACIDs for implicit cycling of HARQ channel identifier <br> N_ACID = Floor{(Max_ReTx_Delay)/(Allocation Period*Frame_length)}+1 |
| } | | |

TABLE 3B-continued

| Syntax | Size in bits | Description/Notes |
|---|---|---|
| Reserved | TBD | Reserved bits |
| Padding | Variable | Padding to reach byte boundary |
| } | — | — |

The same description as that relating to Table 1 can be given on the other fields except for the allocation period field in Tables 3A and 3B (hereinafter, referred to as Table 3A/B). In comparison between Table 3A/B and Table 1, the N_ACID field is omitted and the allocation period field is used for calculation of the N_ACID for persistent allocation in Table 3A/B.

In Table 3A/B, the maximum retransmission delay used for calculation of the N_ACID can be calculated or determined in advance based on a used HARQ scheme and various system parameters. When using an asynchronous HARQ scheme, the retransmission delay boundary value may be used as the maximum retransmission delay. When using a synchronous HARQ scheme, the maximum number of retransmissions may be used as the maximum retransmission delay instead of the retransmission delay boundary value. Accordingly, the N_ACID, which is the number of ACIDs, may be calculated by Equation (2) defined below.

$$N\_ACID = \text{Floor}\{(\text{ReTx\_Delay\_Bound})/(\text{Allocation\_Period})\}+1, \text{ if asynchronous HARQ is used}$$

$$N\_ACID = \text{Floor}\{(N\_Max\_ReTx)/(\text{Allocation\_Period})\}+1, \text{ if synchronous HARQ is used} \quad (2)$$

In equation (2), the HARQ delay boundary value and the maximum number of retransmissions may be either determined in the system, or acquired through a Super-frame Header (SHF), which is used for periodically providing system parameters, or additional broadcasting information.

Table 4 below shows a format of a resource allocation IE, which does not include the N_ACID, in the case of using a synchronous HARQ scheme according to an exemplary embodiment of the present invention.

TABLE 4

| Syntax | Size in bits | Description/Notes |
|---|---|---|
| DL Persistent A-MAP_IE( ) { | — | — |
| Allocation Period | [2] | Indicate Allocation Period (AP) and N_ACID for persistent allocation<br>00: deallocation<br>01: 4 frames<br>10: 6 frames<br>11: 8 frames<br>When Allocation Period > 0<br>N_ACID = Floor{(Max_ReTx_Delay)/(Allocation Period*Frame_Length}+1 |
| If (Allocation Period==0b00){ | | |
| Resource Allocation | Variable | Variable number of bits - depends on system bandwidth. Information may include:<br>Type of resource unit (DRU/CRU)<br>Location (start/end)<br>Allocation size |
| HFA | [4] | HARQ Feedback Allocation |
| } else if (Allocation Period != 0b00){ | | |
| MCS | 4 | Depends on supported modes, 16 modes assumed as baseline |
| MEF | 2 | MIMO encoder format<br>0b00: SFBC<br>0b01: Vertical encoding<br>0b10: Horizontal encoding<br>0b11: n/a |
| if (MEF == 0b01){ | | Parameters for vertical encoding |
|   if(Nt == 2){ | | |
|     Mt | 1 | Number of streams in transmission for Nt = 2<br>(Mt <= Nt)<br>0b0: 1 stream<br>0b1: 2 streams |
|   }else if(Nt == 4){ | | |
|     Mt | 2 | Number of streams in transmission for Nt = 4<br>(Mt <= Nt)<br>0b00: 1 stream<br>0b01: 2 streams<br>0b10: 3 streams<br>0b11: 4 streams |

TABLE 4-continued

| Syntax | Size in bits | Description/Notes |
|---|---|---|
| }else if(Nt == 8){ | | |
|   Mt | 3 | Number of streams in transmission for Nt = 8 (Mt <= Nt) <br> 0b000: 1 stream <br> 0b001: 2 streams <br> 0b010: 3 streams <br> 0b011: 4 streams <br> 0b100: 5 streams <br> 0b101: 6 streams <br> 0b110: 7 streams <br> 0b111: 8 streams |
| } | | |
| } else if(MEF == 0b10){ | | Parameters for horizontal encoding |
|   if(Nt == 2){ | | |
|     PSI | 1 | Allocated pilot stream index for Nt = 2 <br> 0b0: #1 stream <br> 0b1: #2 stream |
|     Mt | 1 | Number of streams in transmission for Nt = 2 (Mt <= Nt) <br> 0b0: 1 stream <br> 0b1: 2 streams |
|   } else{ | | |
|     PSI | 2 | Allocated pilot stream index for Nt = 4 or 8 <br> 0b00: #1 stream <br> 0b01: #2 stream <br> 0b10: #3 stream <br> 0b11: #4 stream |
|     Mt | 2 | Number of streams in transmission for Nt = 4 or 8 (Mt <= Nt) <br> 0b00: 1 stream <br> 0b01: 2 streams <br> 0b10: 3 streams <br> 0b11: 4 streams |
|   } | | |
| } | | |
| Resource Allocation | Variable | Variable number of bits - depends on system bandwidth. Information may include: <br> Type of resource unit (DRU/CRU) <br> Location (start/end) <br> Allocation size |
| Long TTI Indicator | 1 | Indicates number of subframes spanned by the allocated resource. <br> 0b0: 1 subframe (default) <br> 0b1: 4 DL subframes for FDD or all DL subframes for TDD |
| if ($N_{subframe, A\text{-}MAP}$ == 2){ | | |
|   Allocation Relevance | 1 | Subframe index when an A-MAP region occurs every 2 subframes ($N_{subframe, A\text{-}MAP}$ = 2) <br> 0b0: Allocation in the first DL subframe relevant to an A-MAP region <br> 0b1: Allocation in the second DL subframe relevant to an A-MAP region |
| } | | |
| HFA | [4] | HARQ Feedback Allocation |
| ACID | 4 | HARQ channel identifier. The ACID field should be set to the initial value of HARQ channel identifier for implicit cycling of HARQ channel identifiers. |
| } | | |
| Reserved | TBD | Reserved bits |
| Padding | Variable | Padding to reach byte boundary |
| } | — | — |

The same description as that relating to Table 1 can be given on the other fields except for the allocation period field in Table 4. In Table 4, the N_ACID field is omitted and the allocation period field is used for calculation of the N_ACID for persistent allocation. Although not separately described, the specific fields of Table 4 do not limit the scope of the present invention, and some fields may be omitted, added, or rearranged in Table 4 without affecting the scope of the present invention. For example, a mathematical expression relating to the calculation of N_ACID may be inserted in the information field of the ACID or other positions instead of the information field of the allocation period.

Figure 5:
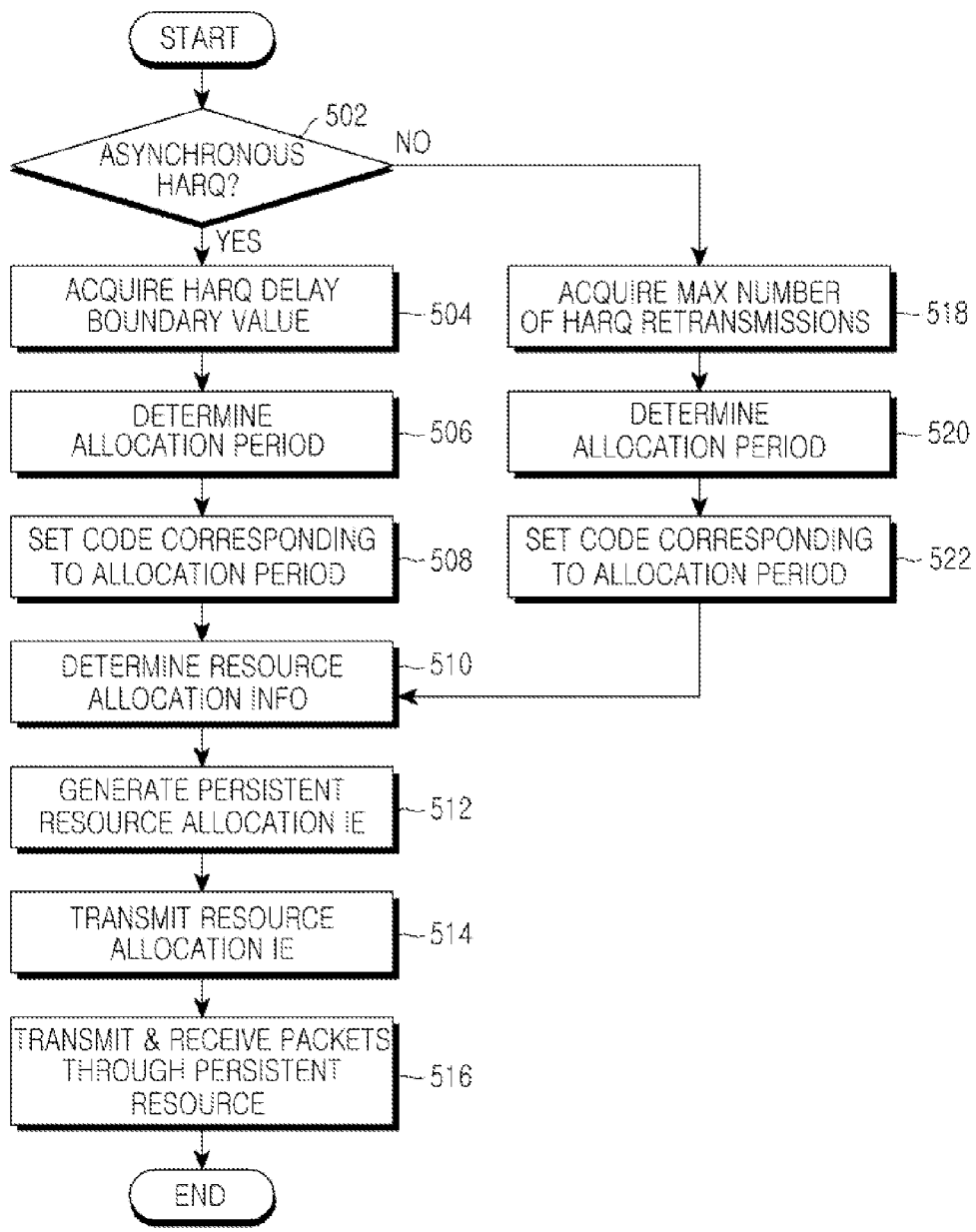
FIG. 5 is a flowchart illustrating a process of transmitting a resource allocation IE by a Base Station (BS) of a broadband wireless communication system according to an exemplary embodiment of the present invention.

FIG. 5 is a flowchart illustrating a process of transmitting a resource allocation IE by a BS of a broadband wireless communication system according to an exemplary embodiment of the present invention.

Referring to FIG. 5, the BS determines in step 502 whether synchronous or asynchronous HARQ is used. If asynchronous HARQ is used, the BS proceeds to step 504. In step 504, the BS reads out the retransmission delay boundary value set in the system from a memory or provides a preset retransmission delay boundary value to the MS through a super-frame header or additional broadcast information. In step 506, the BS determines the allocation period of the MS, to which the persistent resource is to be allocated based on the traffic properties of the MS or other conditions. In step 508, the BS sets a code indicating the allocation period, and proceeds to step 510. The code may be, for example, one of "01", "10", and "11" in Table 3.

In step 510, the BS determines resource allocation information indicating the persistent resource allocated to the MS. In step 512, the BS generates a resource allocation IE including the allocation period and the resource allocation information, and in step 514, loads the generated resource allocation IE on a MAP message and transmits the MAP message to the MS. The resource allocation IE does not include the number of ACIDs to be used in the persistent allocation. Accordingly, in step 516, the BS calculates the number of ACIDs using the allocation period included in the resource allocation IE and the retransmission delay boundary value acquired in step 504, and performs a communication with the MS based on the persistent resource indicated by the resource allocation information according to the allocation period and the calculated number of ACIDs.

If asynchronous HARQ is being used as determined in step 502, the BS proceeds to step 518. In step 518, the BS reads out the maximum number of retransmissions set in the system from the memory or provides a preset maximum number of retransmissions to the MS through a super-frame header or additional broadcast information. In step 520, the BS determines the allocation period of the MS, to which the persistent resource is to be allocated, based on the traffic properties of the MS or other conditions. In step 522, the BS sets a code indicating the allocation period, for example, one of "01", "10", and "11" in Table 4, and proceeds to step 510. In this case, in step 516, the BS calculates the number of ACIDs by using the allocation period included in the resource allocation IE and the maximum number of retransmissions acquired in step 518.

Figure 6:
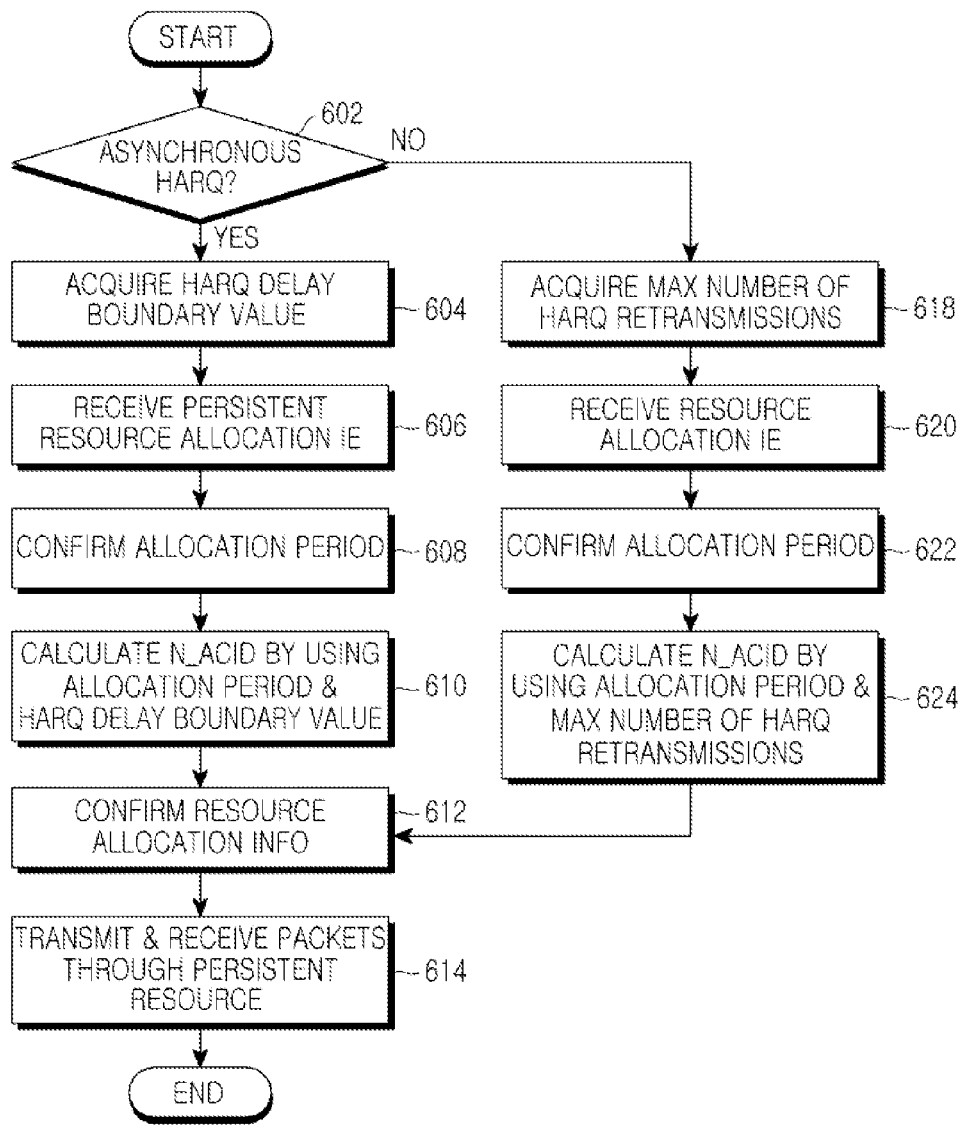
FIG. 6 is a flowchart illustrating a process of receiving a resource allocation IE by a Mobile Station (MS) of a broadband wireless communication system according to an exemplary embodiment of the present invention.

FIG. 6 is a flowchart illustrating a process of receiving a resource allocation IE by an MS of a broadband wireless communication system according to an exemplary embodiment of the present invention.

Referring to FIG. 6, the MS determines in step 602 whether synchronous or asynchronous HARQ is being used. If asynchronous HARQ is used, the MS proceeds to step 604. In step 604, the MS reads out the retransmission delay boundary value set in the system from a memory or acquires a preset retransmission delay boundary value from a super-frame header or additional broadcast information transmitted from the BS. In step 606, the MS receives a map message including a resource allocation IE from the BS. In step 608, the MS identifies the allocation period for persistent allocation from the resource allocation IE.

In step 610, the MS calculates the number of ACIDs necessary for persistent allocation using the retransmission delay boundary value acquired in step 604. In step 612, the MS identifies the persistent resource according to the resource allocation information included in the resource allocation IE. In step 614, the MS performs a communication with the BS based on the persistent resource indicated by the resource allocation information according to the allocation period and the calculated number of ACIDs.

If synchronous HARQ is used, as determined in step 602, the MS proceeds to step 618. In step 618, the MS reads out the maximum number of retransmissions set in the system from a memory or acquires a preset maximum number of retransmissions from a super-frame header or additional broadcast information transmitted from the BS. In step 620, the MS receives a MAP message including a resource allocation IE from the BS. In step 622, the MS identifies the allocation period for persistent allocation from the resource allocation IE.

In step 624, the MS calculates the number of ACIDs necessary for persistent allocation using the maximum number of retransmissions acquired in step 618. Operation then proceeds to step 612 discussed above.

Figure 7:
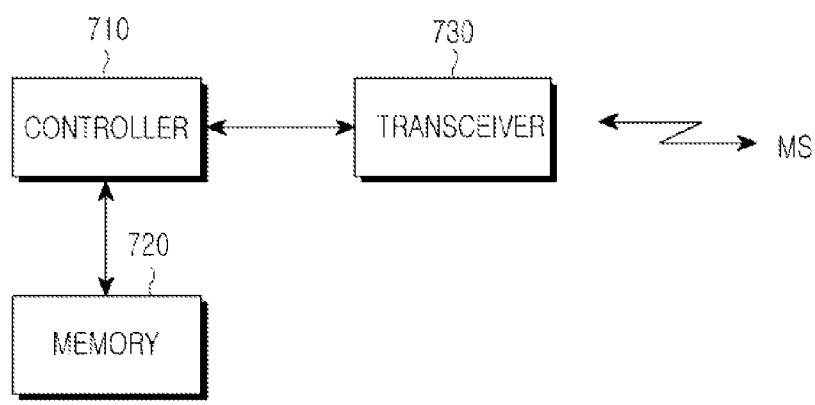
FIG. 7 is a block diagram illustrating a configuration of a BS according to an exemplary embodiment of the present invention.

FIG. 7 is a block diagram illustrating a configuration of a BS according to an exemplary embodiment of the present invention.

Referring to FIG. 7, the BS includes a controller 710, a memory 720, and a transceiver 730. According to other exemplary embodiments of the present invention, the BS may include additional and/or different units.

The controller 710 allocates a persistent resource to the MS according to the persistent allocation scheme, determines an allocation period for a persistent resource, and calculates the number of ACIDs based on the allocation period and pre-acquired maximum retransmission delay (e.g. retransmission delay boundary value and maximum number of retransmissions). The memory 720 stores a program code and parameter values necessary for the operation of the controller 710, for example, the retransmission delay boundary value (or maximum number of retransmissions).

Thereafter, the controller 710 generates a MAP message based on a resource allocation IE including the allocation period and resource allocation information indicating the persistent resource and transmits the MAP message to the transceiver 730. The transceiver 730 then transmits the MAP message to the MS based on a transmission scheme and a channel promised between the BS and the MS.

The transceiver 730 includes a transmitter and a receiver. The transceiver 730 transmits packets to the MS or receives packets from the MS through the persistent resource based on the allocation period, the number of ACIDs, and the maximum retransmission delay (e.g. retransmission delay boundary value or maximum number of retransmissions), which are provided by the controller 710.

Figure 8:
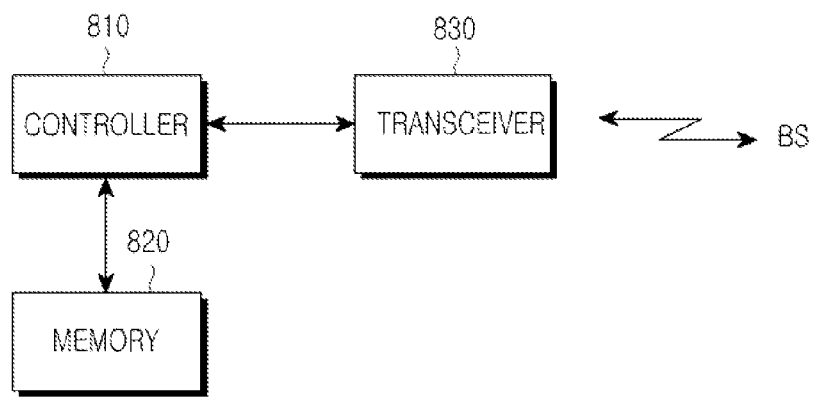
FIG. 8 is a block diagram illustrating a configuration of an MS according to an exemplary embodiment of the present invention.

FIG. 8 is a block diagram illustrating a configuration of an MS according to an exemplary embodiment of the present invention.

Referring to FIG. 8, the MS includes a controller 810, a memory 820, and a transceiver 830. The transceiver 830 receives a MAP message from the BS and provides the received map message to the controller 810. The controller 810 extracts a resource allocation IE from the map message. The resource allocation IE includes the allocation period for the persistent resource and resource allocation information indicating the persistent resource allocated for the MS. The controller 810 calculates the number of ACIDs based on the allocation period and pre-acquired maximum retransmission delay (for example, retransmission delay boundary value or maximum number of retransmissions). The memory 820 stores a program code and parameter values necessary for the operation of the controller 810, for example, the retransmission delay boundary value (or maximum number of retransmissions).

The transceiver 830 includes a transmitter and a receiver. Based on the allocation period, the number of ACIDs, and the maximum retransmission delay (e.g. retransmission delay boundary value or maximum number of retransmissions), which are provided by the controller 810, the transceiver 830 receives packets from the BS or transmits packets to the BS through the persistent resource.

The above description discusses exemplary embodiments in which a retransmission delay boundary value or a maximum number of retransmissions is used as the maximum retransmission delay in calculation of the number of ACIDs. Hereinafter, other exemplary embodiments in determining the maximum retransmission delay of the HARQ scheme will be described. The exemplary embodiments described below can be applied to the format of the resource allocation IE, flowcharts, and block diagrams described above in calculation of the N_ACID.

When an asynchronous HARQ scheme is used in the downlink, the N_ACID, which corresponds to the number of ACIDs necessary for the persistent allocation, can be calculated by Equation (3) below.

$$N\_ACID = Floor\{DL\_Max\_ReTx\_Delay / Allocation\_Period\} + 1 \quad (3)$$

In Equation (3), the DL_Max_ReTx_Delay refers to the maximum retransmission delay of the persistent resource in the downlink, which can be defined by Equation (4) below using the maximum number of retransmissions (N_MAX_ReTx) and the frame length (Frame_length).

$$DL\_Max\_ReTx\_Delay = DL\_PA\_ReTx\_Interval * N\_MAX\_ReTx / Frame\_length \quad (4)$$

In Equation (4), the DL_PA_ReTx_Interval corresponds to the smaller value from among the maximum delay (T_ReTx_Interval) between consecutive retransmissions in the downlink and a product of the frame length and the allocation period for persistent allocation, and is determined by Equation (5) below.

$$DL\_PA\_ReTx\_Interval = \min\{(Allocation\_Period * Frame\_length), T\_ReTx\_Interval\} \quad (5)$$

In Equation (5), the N_MAX_ReTx and the T_ReTx_Interval are determined in the system, provided through at least one information field of the Super-Frame Header (SFH), or provided through the additional broadcast information of the super-frame header.

When the synchronous HARQ scheme is used in the uplink, the N_ACID, i.e. the number of ACIDs necessary for the persistent allocation, can be calculated by Equation (6) below.

$$N\_ACID = Floor\{UL\_Max\_ReTx\_Delay / Allocation\_Period\} + 1 \quad (6)$$

In Equation (6), the UL_Max_ReTx_Delay refers to the maximum retransmission delay in the uplink, and can be defined by Equation (7) below based on the maximum number of retransmissions (N_MAX_ReTx) and the frame length (Frame_length).

$$UL\_Max\_ReTx\_Delay = (UL\_PA\_ReTx\_Interval * N\_MAX\_ReTx) / Frame\_length \quad (7)$$

In Equation (7), the UL_PA_ReTx_Interval is determined according to whether the long TTI is used. For example, UL_PA_ReTx_Interval=Frame_length*2 when the Long TTI Indicator of the persistent resource is "1", and UL_PA_ReTx_Interval=Frame_length when the Long TTI Indicator of the persistent resource is "0". The N_MAX_ReTx is determined in the system, and is provided through at least one information field of the Super-Frame Header (SFH), or through the additional broadcast information of the super-frame header.

When the synchronous HARQ scheme is used in the downlink, the N_ACID, i.e. the number of ACIDs necessary for the persistent allocation, can be calculated by Equation (8) below.

$$N\_ACID = Floor\{DL\_Max\_ReTx\_Delay / Allocation\_Period\} + 1$$

$$DL\_Max\_ReTx\_Delay = DL\_PA\_ReTx\_Interval * N\_MAX\_ReTx / Frame\_length \quad (8)$$

In Equation (8), the DL_PA_ReTx_Interval is determined according to whether a long TTI is used. For example, DL_PA_ReTx_Interval=Frame_length*2 when the long TTI indicator of the persistent resource is "1", and DL_PA_ReTx_Interval=Frame_length when the long TTI indicator of the persistent resource is "0". The N_MAX_ReTx is determined in the system, and is provided through at least one information field of the super-frame header, or through the additional broadcast information of the super-frame header.

When the asynchronous HARQ scheme is used in the uplink, the N_ACID, i.e. the number of ACIDs necessary for the persistent allocation, can be calculated by Equation (9) below.

$$N\_ACID = Floor\{UL\_Max\_ReTx\_Delay / Allocation\_Period\} + 1$$

$$UL\_Max\_ReTx\_Delay = UL\_PA\_ReTx\_Interval * N\_MAX\_ReTx / Frame\_length$$

$$UL\_PA\_ReTx\_Interval = \min\{(Allocation\_Period * Frame\_length), T\_ReTx\_Interval\} \quad (9)$$

In Equation (9), the N_MAX_ReTx and the T_ReTx_Interval are determined in the system, and may be provided through at least one information field of the super-frame header, or through the additional broadcast information of the super-frame header.

When the synchronous HARQ scheme is used in both the downlink and the uplink, the N_ACID, i.e. the number of ACIDs necessary for the persistent allocation, can be calculated by Equation (10) below.

$$N\_ACID = Floor\{PA\_Max\_ReTx\_Delay / Allocation\_Period\} + 1$$

$$PA\_Max\_ReTx\_Delay = (PA\_ReTx\_Interval * N\_MAX\_ReTx) / Frame\_length \quad (10)$$

In Equation (10), the PA_ReTx_Interval is determined according to whether the long TTI is used. For example, PA_ReTx_Interval=Frame_length*2 when the Long TTI Indicator of the persistent resource is "1", and PA_ReTx_Interval=Frame_length when the Long TTI Indicator of the persistent resource is "0". The N_MAX_ReTx is determined in the system, and may be provided through at least one information field of the super-frame header, or through the additional broadcast information of the super-frame header.

When the asynchronous HARQ scheme is used in both the downlink and the uplink, the N_ACID, i.e. the number of ACIDs necessary for the persistent allocation, can be calculated by Equation (11) below.

$$N\_ACID = Floor\{PA\_Max\_ReTx\_Delay / Allocation\_Period\} + 1$$

$$PA\_Max\_ReTx\_Delay = PA\_ReTx\_Interval * N\_MAX\_ReTx / Frame\_length$$

$$PA\_ReTx\_Interval = \min(Allocation\_Period * Frame\_length, T\_ReTx\_Interval) \quad (11)$$

In Equation (11), the N_MAX_ReTx and the T_ReTx_Interval are determined in the system, and may be provided through at least one information field of the super-frame header, or through the additional broadcast information of the super-frame header.

Additional exemplary embodiments for determining the maximum retransmission delay of the HARQ scheme are described below.

According to an exemplary embodiment of the present invention, the N_ACID, i.e. the number of ACIDs necessary for the persistent allocation, can be calculated by Equation (12) below.

$$N\_ACID=Floor\{PA\_Max\_ReTx\_Delay/(Allocation\_Period*Frame\_length)\}+1$$

$$PA\_Max\_ReTx\_Delay=PA\_ReTx\_Interval*N\_MAX\_ReTx \quad (12)$$

In Equation (12), the PA_ReTx_Interval is determined according to whether the long TTI is used. For example, PA_ReTx_Interval=Frame_length*2 when the Long TTI Indicator of the persistent resource is "1", and PA_ReTx_Interval=Frame_length when the Long TTI Indicator of the persistent resource is "0". The N_MAX_ReTx is determined in the system, provided through at least one information field of the super-frame header, or provided through the additional broadcast information of the super-frame header.

According to another exemplary embodiment of the present invention, the N_ACID, i.e. the number of ACIDs necessary for the persistent allocation, can be calculated by Equation (13) below.

$$N\_ACID=Floor\{DL\_Max\_ReTx\_Delay/(Allocation\_Period*Frame\_length)\}+1$$

$$DL\_Max\_ReTx\_Delay=DL\_PA\_ReTx\_Interval*N\_MAX\_ReTx$$

$$DL\_PA\_ReTx\_Interval=\min\{(Allocation\_Period*Frame\_length), T\_ReTx\_Interval\} \quad (13)$$

In Equation (13), the N_MAX_ReTx and the T_ReTx_Interval are determined in the system, and may be provided through at least one information field of the super-frame header, or through the additional broadcast information of the super-frame header.

According to another exemplary embodiment of the present invention, the N_ACID, i.e. the number of ACIDs necessary for the persistent allocation, can be calculated by Equation (14) below.

$$N\_ACID=Floor\{UL\_Max\_ReTx\_Delay/(Allocation\_Period*Frame\_length)\}+1$$

$$UL\_Max\_ReTx\_Delay=UL\_PA\_ReTx\_Interval*N\_MAX\_ReTx \quad (14)$$

In Equation (14), the UL_PA_ReTx_Interval is determined according to whether the long TTI is used. For example, UL_PA_ReTx_Interval=Frame_length*2 when the Long TTI Indicator of the persistent resource is "1", and UL_PA_ReTx_Interval=Frame_length when the Long TTI Indicator of the persistent resource is "0". The N_MAX_ReTx is determined in the system, provided through at least one information field of the super-frame header, or provided through the additional broadcast information of the super-frame header.

Additional exemplary embodiments of the present invention for determining the parameter "PA_MAX_ReTx_Delay", which indicates the maximum retransmission delay of the HARQ scheme, are described below.

According to an exemplary embodiment of the present invention, the PA_MAX_ReTx_Delay can be calculated by Equation (15) below.

$$PA\_MAX\_ReTx\_Delay=N\_Max\_ReTx*PA\_ReTx\_Interval \quad (15)$$

In Equation (15), the PA_ReTx_Interval is a parameter determined based on the number F of sub-frames for each frame, the data burst processing time TPORC, and the frame length, according to the long TTI, and is calculated by Equation (16) below.

If long TTI indicator=0, $$PA\_ReTx\_Interval=(1+Floor\{(2*TPROC)/F)\})*Frame\_Length,$$

Otherwise, $$PA\_ReTx\_Interval=2*Frame\_Length \quad (16)$$

According to another exemplary embodiment of the present invention, the PA_ReTx_Delay can be calculated by Equation (17) below.

$$PA\_ReTx\_Interval=2*Frame\_Length \quad (17)$$

In Equation (17), the PA_ReTx_Interval is calculated as two times of the frame length regardless of the long TTI indicator.

According to another exemplary embodiment of the present invention, the N_ACID, i.e. the number of ACIDs necessary for the persistent allocation in the downlink, can be calculated by Equation (18) below.

$$N\_ACID=\mod(Floor\{DL\_Max\_ReTx\_Delay/(Allocation\_Period*Frame\_length)\}+1, 16)$$

$$DL\_Max\_ReTx\_Delay=N\_Max\_ReTx*DL\_ReTx\_Interval \quad (18)$$

In Equation (18), the N_Max_ReTx refers to the maximum number of retransmissions in the downlink, and the DL_ReTx_Interval is a parameter indicating the HARQ retransmission delay in the downlink. If the HARQ feedback offset in the downlink is z and the frame length is Frame_length, the HARQ retransmission delay in the downlink can be calculated by Equation (19) below.

$$DL\_ReTx\_Interval=(1+z)*Frame\_length \quad (19)$$

In Equation (19), z has a value determined by the DL HARQ timing.

According to another exemplary embodiment of the present invention, the N_ACID, i.e. the number of ACIDs necessary for the persistent allocation in the uplink, can be calculated by Equation (20) below.

$$N\_ACID=\mod(Floor\{UL\_Max\_ReTx\_Delay/(Allocation\_Period*Frame\_length)\}+1, 8)$$

$$UL\_Max\_ReTx\_Delay=N\_Max\_ReTx*UL\_ReTx\_Interval \quad (20)$$

In Equation (20), the N_Max_ReTx refers to the maximum number of retransmissions in the uplink, and the UL_ReTx_Interval is a parameter indicating the HARQ retransmission delay in the uplink. If the HARQ feedback offset in the uplink is w, the HARQ transmission offset in the uplink is v, and the frame length is Frame_length, the HARQ retransmission delay in the uplink can be calculated by Equation (21) below.

$$UL\_ReTx\_Interval=(1+w+v)*Frame\_length \quad (21)$$

In Equation (21), values of w and v are determined by the UL HARQ transmission and feedback timing.

In a wireless communication system according to exemplary embodiments of the present invention, a resource allocation IE is transmitted without information on the number of ACIDs indicating the HARQ channel identifier, and the number of ACIDs is determined based on the maximum retransmission delay for the HARQ operation and the allocation period, so that the persistent resource is allocated with a minimum overhead. Exemplary embodiments of the present invention can thus improve the efficiency in use of the resources necessary for persistent allocation.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of resource allocation according to a persistent allocation in a wireless communication system, the method comprising:
    generating a persistent allocation Information Element (IE) including an allocation period for persistent allocation and resource allocation information indicating a persistent resource; and
    transmitting the persistent allocation IE to a mobile station,
    wherein the allocation period and a maximum retransmission delay, are used for calculating a number of Automatic Repeat reQuest Channel Identifiers (ACIDs) indicating a number of Hybrid ARQ (HARQ) channels used for a HARQ operation through the persistent resource.

2. The method of claim 1, further comprising:
    calculating the number of ACIDs based on the maximum retransmission delay and the allocation period included in the persistent allocation IE; and
    performing communication through the persistent resource based on the allocation period and the number of ACIDs.

3. The method of claim 1, wherein the maximum retransmission delay is determined based on at least one parameter, which is determined in the wireless communication system or acquired from a Super-Frame Header (SFH) or additional broadcast information periodically transmitted from the mobile station.

4. The method of claim 1, wherein the number of ACIDs is calculated by $$N\_ACID = \mathrm{mod}(\mathrm{Floor}\{Max\_ReTx\_Delay/(Allocation\_Period*Frame\_length)\}+1, X),$$

wherein N_ACID indicates the number of ACIDs, mod indicates the modulus, floor indicates the floor function, the Max_ReTx_Delay indicates the maximum retransmission delay, the Allocation_Period indicates the allocation period, the Frame_length indicates a length of a frame, and X has a value of 16 in a downlink and a value of 8 in an uplink.

5. The method of claim 4, wherein the maximum retransmission delay is calculated by $$MAX\_ReTx\_Delay = N\_Max\_ReTx * ReTx\_Interval,$$

and $$ReTx\_Interval = (1+Y)*Frame\_Length,$$

wherein the N_Max_ReTx indicates a maximum number of retransmissions, the ReTx_Interval is a parameter indicating an HARQ retransmission delay, and Y corresponds to an HARQ feedback offset in the downlink and a sum of an HARQ feedback offset and an HARQ transmission offset in the uplink.

6. A method of receiving a resource allocation according to a persistent allocation in a wireless communication system, the method comprising:
    receiving a persistent allocation Information Element (IE), which includes an allocation period for persistent allocation and resource allocation information indicating a persistent resource, from a base station; and
    calculating a number of Automatic Repeat reQuest Channel Identifiers (ACIDs) based on the allocation period and a maximum retransmission delay for an Hybrid ARQ (HARQ) operation, the number of ACIDs indicating a number of HARQ channels used for the HARQ operation through the persistent resource.

7. The method of claim 6, wherein the maximum retransmission delay is determined based on additional broadcast information periodically transmitted from a mobile station, or based on at least one parameter determined in the wireless communication system or acquired from a Super-Frame Header (SFH).

8. The method of claim 6, wherein the number of ACIDs is calculated by $$N\_ACID = \mathrm{mod}(\mathrm{Floor}\{Max\_ReTx\_Delay/(Allocation\_Period*Frame\_length)\}+1, X),$$

wherein N_ACID indicates the number of ACIDs, mod indicates the modulus, floor indicates the floor function, the Max_ReTx_Delay indicates the maximum retransmission delay, the Allocation_Period indicates the allocation period, a Frame_length indicates the length of a frame, and X has a value of 16 in a downlink and a value of 8 in an uplink.

9. The method of claim 6, wherein the maximum retransmission delay is calculated by $$MAX\_ReTx\_Delay = N\_Max\_ReTx * ReTx\_Interval,$$

and $$ReTx\_Interval = (1+Y)*Frame\_Length,$$

wherein MAX_ReTx_Delay indicates the maximum retransmission delay, N_Max_ReTx indicates a maximum number of retransmissions, ReTx_Interval is a parameter indicating an HARQ retransmission delay, and Y corresponds to an HARQ feedback offset in the downlink and a sum of the HARQ feedback offset and an HARQ transmission offset in the uplink.

10. A base station apparatus for performing resource allocation according to a persistent allocation in a wireless communication system, the base station apparatus comprising:
    a generator for generating a persistent allocation Information Element (IE) including an allocation period for persistent allocation and resource allocation information indicating a persistent resource; and
    a transmitter for transmitting the persistent allocation IE to a mobile station,
    wherein the allocation period and a maximum retransmission delay are used for calculating a number of Automatic Repeat reQuest Channel Identifiers (ACIDs) indicating a number of Hybrid Automatic Repeat Request (HARQ) channels used for an HARQ operation through the persistent resource.

11. The base station apparatus of claim 10, wherein a controller calculates the number of ACIDs based on the maximum retransmission delay and the allocation period included in the persistent allocation IE, and performs communication through the persistent resource based on the allocation period and the number of ACIDs.

12. The base station apparatus of claim 10, wherein the maximum retransmission delay is determined based on additional broadcast information periodically transmitted from the mobile station, or based on at least one parameter determined in the system or acquired from a Super-Frame Header (SFH).

13. The base station apparatus of claim 10, wherein the number of ACIDs is calculated by $$N\_ACID = \mathrm{mod}(\mathrm{Floor}\{Max\_ReTx\_Delay/(Allocation\_Period*Frame\_length)\}+1, X),$$

wherein N_ACID indicates the number of ACIDs, mod indicates the modulus, floor indicates the floor function, Max_ReTx_Delay indicates the maximum retransmission delay, Allocation_Period indicates the allocation period, Frame_length indicates a length of a frame, and X has a value of 16 in a downlink and a value of 8 in an uplink.

14. The base station apparatus of claim 13, wherein the maximum retransmission delay is calculated by $$MAX\_ReTx\_Delay = N\_Max\_ReTx * ReTx\_Interval,$$
and
$$ReTx\_Interval = (1+Y)*Frame\_Length,$$

wherein MAX_ReTx_Delay indicates the maximum retransmission delay, N_Max_ReTx indicates a maximum number of retransmissions, ReTx_Interval is a parameter indicating an HARQ retransmission delay, and Y corresponds to an HARQ feedback offset in the downlink and a sum of the HARQ feedback offset and an HARQ transmission offset in an uplink.

15. A mobile station apparatus for receiving a resource allocation according to a persistent allocation in a wireless communication system, the mobile station apparatus comprising:
 a receiver for receiving a persistent allocation Information Element (IE), which includes an allocation period for persistent allocation and resource allocation information indicating a persistent resource, from a base station; and
 a controller for calculating a number of ACIDs based on the allocation period and a maximum retransmission delay for an HARQ operation, the number of ACIDs indicating a number of Hybrid Automatic Repeat Request (HARQ) channels used for the HARQ operation through the persistent resource.

16. The mobile station apparatus of claim 15, wherein the maximum retransmission delay is determined based on additional broadcast information periodically transmitted from the mobile station, or based on at least one parameter determined in the wireless communication system or acquired from a Super-Frame Header (SFH).

17. The mobile station apparatus of claim 15, wherein the number of ACIDs is calculated by $$N\_ACID = \mathrm{mod}(\mathrm{Floor}\{Max\_ReTx\_Delay/(Allocation\_Period*Frame\_length)\}+1, X),$$

wherein N_ACID indicates the number of ACIDs, mod indicates the modulus, floor indicates the floor function, Max_ReTx_Delay indicates the maximum retransmission delay, the Allocation_Period indicates the allocation period, the Frame_length indicates a length of a frame, and X has a value of 16 in a downlink and a value of 8 in an uplink.

18. The mobile station apparatus of claim 17, wherein the maximum retransmission delay is calculated by $$MAX\_ReTx\_Delay = N\_Max\_ReTx * ReTx\_Interval,$$
and
$$ReTx\_Interval = (1+Y)*Frame\_Length,$$

wherein MAX_ReTx_Delay indicates the maximum retransmission delay, N_Max_ReTx indicates a maximum number of retransmissions, the ReTx_Interval is a parameter indicating an HARQ retransmission delay, and Y corresponds to an HARQ feedback offset in the downlink and a sum of the HARQ feedback offset and the HARQ transmission offset in the uplink.

19. A mobile system comprising:
 a base station for generating a persistent allocation Information Element (IE) including an allocation period for persistent allocation and resource allocation information indicating a persistent resource and for transmitting the persistent allocation IE; and
 a mobile station for receiving the persistent allocation IE transmitted from the base station and for calculating a number of Automatic Repeat reQuest Identifiers (ACIDs) indicating a number of Hybrid ARQ (HARQ) channels used for a HARQ operation through the persistent resource.

20. The mobile system of claim 19, wherein the number of ACIDs is calculated according to $$N\_ACID = \mathrm{mod}(\mathrm{Floor}\{Max\_ReTx\_Delay/(Allocation\_Period*Frame\_length)\}+1, X),$$

wherein N_ACID indicates the number of ACIDs, mod indicates the modulus, floor indicates the floor function, Max_ReTx_Delay indicates a maximum retransmission delay, the Allocation_Period indicates the allocation period, the Frame_length indicates a length of a frame, and X has a value of 16 in a downlink and a value of 8 in an uplink.

21. The mobile system of claim 20, wherein the maximum retransmission delay is determined as $$Max\_ReTx\_Delay = ReTx\_Interval * N\_MAX\_ReTx / Frame\_length$$

$$ReTx\_Interval = \min(Allocation\_Period * Frame\_length, T\_ReTx\_Interval)$$

where ReTx_Interval indicates a maximum delay between consecutive retransmissions, min indicates a minimum, $T_{\_ReTx}\_Interval$ indicates a maximum delay between consecutive retransmissions in the downlink, and $N_{\_MAX}\_ReTx$ indicates a maximum number of retransmissions.

22. The mobile system of claim 21, wherein the maximum number of retransmissions and the maximum delay between consecutive retransmissions is determined by the mobile station or provided in a super-frame header received by the mobile station from the base station.

* * * * *